United States Patent [19]

Shibahata et al.

[11] Patent Number: 4,613,153
[45] Date of Patent: Sep. 23, 1986

[54] STABILIZER FOR AN AUTOMOTIVE VEHICLE

[75] Inventors: Yasuji Shibahata, Yokohama; Yukio Fukunaga, Zushi; Kenji Nakamura, Yokohama; Yasumasa Tsubota, Yokosuka; Namio Irie, Yokohama; Junsuke Kuroki, Yokohama, all of Japan

[73] Assignee: Nissan Motor Co., Ltd., Yokohama, Japan

[21] Appl. No.: 700,200

[22] Filed: Feb. 11, 1985

[30] Foreign Application Priority Data

Feb. 14, 1984 [JP] Japan ................................. 59-24488

[51] Int. Cl.⁴ ............................................ B60G 11/00
[52] U.S. Cl. ................................. 280/689; 280/688; 280/665
[58] Field of Search ............... 280/689, 688, 703, 700, 280/717, 665; 267/11 R

[56] References Cited

U.S. PATENT DOCUMENTS

| 2,802,674 | 8/1957 | Jackson | 280/112 |
| 4,218,072 | 8/1980 | Wallis | 280/689 |
| 4,429,899 | 2/1984 | Ohno | 280/689 |

FOREIGN PATENT DOCUMENTS

| 2630698 | 1/1978 | Fed. Rep. of Germany . |
| 2800549 | 7/1979 | Fed. Rep. of Germany . |
| 1452827 | 8/1966 | France . |
| 836298 | 6/1960 | United Kingdom . |
| 895095 | 5/1962 | United Kingdom . |
| 1012087 | 12/1965 | United Kingdom . |
| 2006131 | 5/1979 | United Kingdom . |

Primary Examiner—Richard A. Bertsch
Attorney, Agent, or Firm—Leydig, Voit & Mayer, Ltd.

[57] ABSTRACT

Extensible hydraulic cylinders are used for attaching a stabilizer bar to a vehicle body so that attaching portions of the stabilizer bar are movable toward and away from the vehicle body as the hydraulic cylinders extend and contract, whereby to adjustably change the effectiveness in accordance with variation of running condition of the vehicle.

14 Claims, 5 Drawing Figures

STABILIZER FOR AN AUTOMOTIVE VEHICLE

BACKGROUND OF THE INVENTION

1. Field of the Invention

The present invention relates in general to wheel suspensions for automotive vehicles and more particularly to stabilizers of such suspensions.

2. Description of the Prior Art

Stabilizers include stabilizer bars usually made of round bar bent to a U-shape. The stabilizer bars have attaching or journal portions where they are rotatably attached to vehicle bodies through stabilizer brackets and rubber bushings. The journal portions of the stabilizer bars are virtually not movable toward and away from the vehicle bodies except for a small amount due to the resilience of the rubber bushings.

A large diameter stabilizer bar is desirable in terms of a roll rigidity of a vehicle. However, such a large diameter stabilizer bar is heavy and costly. Further, it adversely affects shock-absorbing action of associated suspension springs and shock absorbers, thus deteriorating a riding comfort and road-holding performance of a vehicle.

SUMMARY OF THE INVENTION

In accordance with the present invention, there is provided an improved stabilizer for an automotive vehicle.

The vehicle has a body and a pair of laterally opposed road wheels independently suspended on the vehicle body for upward and downward movement relative to each other and the vehicle body. The stabilizer comprises a stabilizer bar twistable to resist the relative upward and downward movement of the road wheels and having two axially opposed attaching portions at which it is to be attached to the vehicle body, and means for rotatably attaching the attaching portions to the vehicle body in such a manner that at least one of the attaching portions is movable upwardly and downwardy relative to the vehicle body to change the effectiveness of the stabilizer bar in accordance with variation of running condition of the vehicle.

The above structure is quite effective for solving the problems inherent in the prior art stabilizer.

It is accordingly an object of the present invention to provide a stabilizer for an autqmotive vehicle which can increase the roll rigidity or stability of the vehicle without lowering the riding comfort.

It is another object of the present invention to provide a stabilizer of the above mentioned character which enables the vehicle to make turns or cornerings more safely and quickly.

It is a further object of the present invention to provide a stabilizer of the above mentioned character which can increase a roll rigidity of the vehicle without requiring a large diameter stabilizer bar.

BRIEF DESCRIPTION OF THE DRAWINGS

The features and advantages of the stabilizer according to the present invention will become more clearly appreciated from the following description taken in conjunction with the accompanying drawings, in which.

DETAILED DESCRIPTION OF THE PREFERRED EMBODIMENTS

Figure 1:
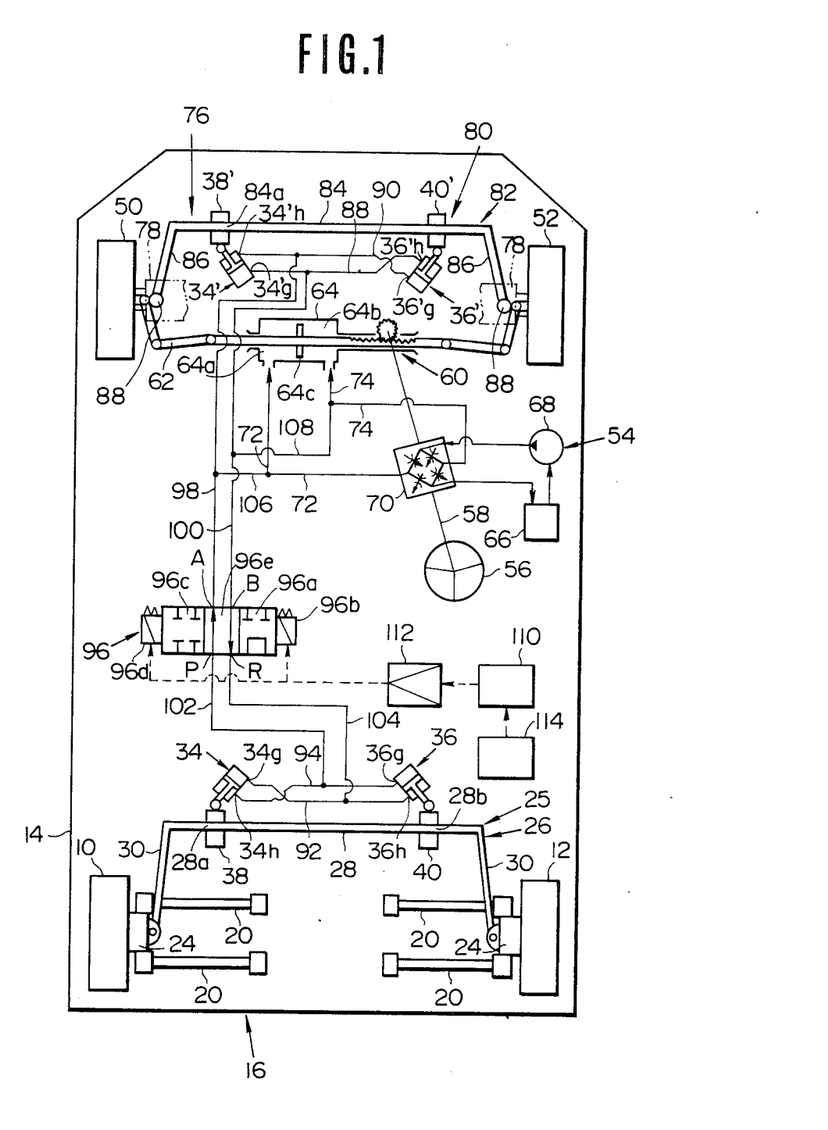
FIG. 1 is a schematic plan view of a stabilizer according to an embodiment of the present invention.
Figure 2:
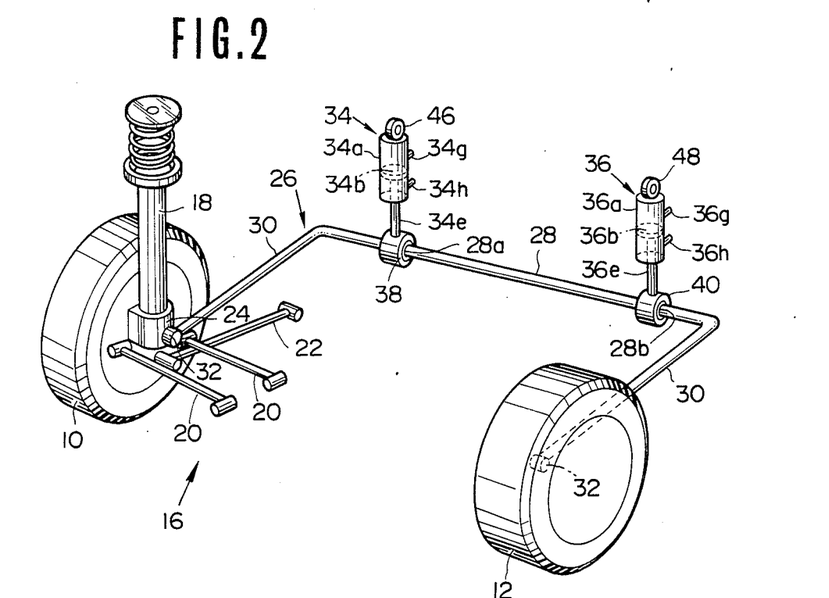
FIG. 2 is an enlarged perspective view of a rear stabilizer bar and a pair of hydraulic cylinders for the mounting thereof employed in the stabilizer of FIG. 1.
Figure 3:
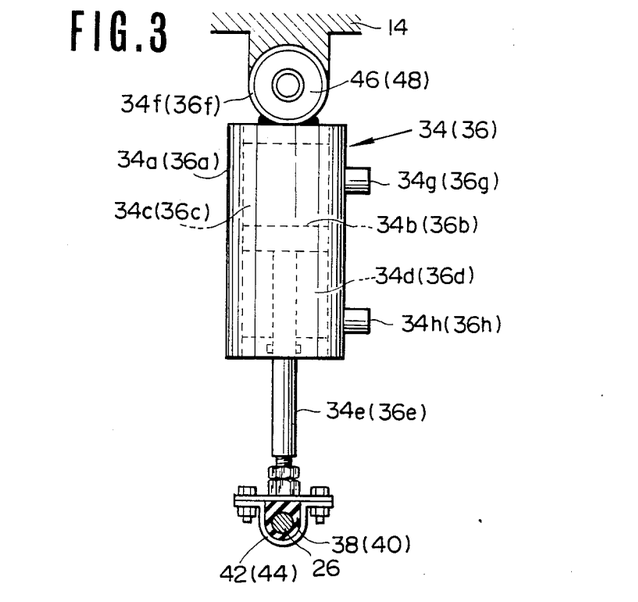
FIG. 3 is an enlarged side elevational view of one of the hydraulic cylinders of FIG. 2.

Referring now to FIGS. 1 through 3 and one preferred embodiment of the present invention, the reference numerals 10 and 12 designate a pair of rear road wheels which are independently suspended for rising and falling movement relative to each other and also to a vehicle body 14 by means of a suitable suspension such as a strut type rear suspension 16. The strut type rear suspension 16 is of the conventional type and mainly consists of two struts 18, tow pairs of parallel transverse links 20 and two trailing links 22, though some constituent parts are omitted in the drawings. The struts 18 have shock absorbers therewithin and are swingably mounted at the upper ends thereof on the vehicle body 14 while mounting at the lower ends thereof wheel supporting members 24 such as wheel spindles on which the rear road wheels 10 and 12 are rotatably carried. The parallel trasverse links 20 are pivotally connected at the inner ends thereof with the vehicle body 14 and at the outer ends thereof with the wheel supporting members 24. The trailing links 22 extend longitudinally of the vehicle body 14 and are pivotally connected at the front ends thereof with the vehicle body 14 and at the rear ends thereof with the struts 18.

The reference numeral 25 generally designates a rear stabilizer which includes a U-shaped stabilizer bar 26 having a main body 28 extending transversely of the vehicle body 14 and lever arms 30 at each end thereof extending generally longitudinally rearwardly of the vehicle body 14 and each terminating in laterally extending terminal end portions 32 pivotally connected to the wheel supporting members 24.

The main body 28 is rotatably mounted on the vehicle body 14. In this connection, as mentioned in the "Description of the Prior Art", it has heretofore been practiced to rotatably attach the main body of the stabilizer bar to the vehicle body through stabilizer brackets and rubber bushings so that the attaching portions of the main body are virtually not movable toward and away from the vehicle body.

In accordance with the present invention, the main body 28 of the stabilizer bar 26 is attached at 28a and 28b to the vehicle body 14 through hydraulic cylinders 34 and 36 so that the attaching portions or journal portions 28a and 28b are movable toward and away from the vehicle body as the hydraulic cylinders contract and extend.

The hydraulic cylinders 34 and 36 are arranged to extend vertically though not so shown in FIG. 1 for the purpose of illustration. Each hydraulic cylinder 34 or 36 includes of a cylinder body 34a or 36a, an annular piston 34b or 36b slidably mounted in the cylinder body 34a or 36a to define on the opposed sides thereof upper and lower fluidly separated cylinder chambers 34c and 34d or 36c and 36d, and a piston rod 34e or 36e extending through the lower cylinder chamber 34d or 36d to have an upper end attached to the piston 34b or 36b and lower end projecting downwardly from the lower end of the cylinder body 34a or 36a. The lower end of the piston rod 34e or 36e is rotatably attached to the main body portion 28a or 27b of the stabilizer bar 26 through a rubber bushing 38 or 40 and a bracket 42 or 44. On the other hand, the cylinder body 34a or 36a has at the upper end thereof an attachment ring 34f or 36f where it is rotatably attached to the vehicle body through a rubber-steel bushing 46 or 48. The upper and lower cylinder chambers 34c or 36c and 34d or 36d are respectively provided with ports 34g or 34h and 36g or 36h through which hydraulic fluid under pressure is supplied thereinto or discharged therefrom.

With the foregoing arrangement, when the upper cylinder chamber 34c or 36c is supplied with hydraulic fluid under pressure while the lower cylinder chamber 34d or 36d being drained, the hydraulic cylinder 34 or 36 contracts causing the attaching portion 28a or 28b of the stabilizer bar 26 to move to a position closer to the vehicle body 14. On the other hand, when the lower cylinder chamber 34d or 36d is supplied with hydraulic fluid under pressure while the upper cylinder chamber 34c or 36c being drained, the hydraulic cylinder 34 or 36 extends causing the attaching portion 28a or 28b of the stabilizer bar 26 to move to a lower position, i.e., a position remoter from the vehicle body 14.

The reference numerals 50 and 52 designate a pair of front road wheels which are turnable to the left and right under the control of a power steering system 54. The steering system 54 includes a steering wheel 56, a steering shaft 58 rotatable with the steering wheel 56, a rack and pinion steering gear 60 operatively connected to the steering wheel 56 through the steering shaft 58, and a steering linkage 62 with which the rack and pinion steering gear 60 is operatively connected to the front road wheels 50 and 52. In order to assist turning of the front road wheels, the steering system 54 further includes a power cylinder or hydraulic servo 64 mounted in the steering linkage 62, a reservoir 66, a pump 68 having an inlet fluidly connected to the reservoir 66 and an outlet fluidly connected to the power cylinder 64, and a rotary control valve 70 mounted on the steering shaft 58 for properly routing hydraulic fluid in response to rotation of the steering wheel 56. More specifically, the rotary control valve 70 is fluidly connected to the power cylinder 64, resevoir 66 and pump 68 in such a manner that when the steering wheel 56 is turned to the left or in the counterclockwise direction, a chamber 64a of the power cylinder 64 is pressurized with hydraulic fluid supplied thereto from the pump 68 through a conduit 74 while a chamber 64b of the power cylinder 64 is drained into the reservoir 66 through a conduit 74. This drives a piston 64c of the power cylinder 64 to stroke in the rightward direction in the drawing to assist the turning of the front road wheels 50 and 52 to the left. Conversely, when the steering wheel 56 is turned to the right or in the clockwise direction, the chamber 64b of the power cylinder 64 is pressurized through the conduit 74 while the chamber 64a is drained through the conduit 72. The piston 64c of the power cylinder 64 is thus driven to stroke in the leftward direction in the drawing to assist the turning of the front road wheels 50 and 52 to the right.

The front road wheels 50 and 52 are independently suspended for rising and falling movement relative to each and also to the vehicle body 14 by a suitable front suspension 76. The front suspension 76 includes a pair of suspension members 78, e.g. transverse links, which are movable upwardly and downwardly together with the front road wheels 50 and 52.

The reference neumeral 80 generally designates a front stabilizer which includes a stabilizer bar 82 having a main body 84 extending transversely of the vehicle body 14 and lever arms 86 at each end thereof extending logitudinally rearwardly of the vehicle body 14 to terminate in end portions 88 pivotally connected to the suspension members 78. The main body 84 of the front stabilizer bar 82 is attached at 84a and 84b to the vehicle body 14 in a manner similar to the rear stabilizer bar 26, i.e., in a manner to be movable upwardly and downwardly relative to the vehicle body by means of hydraulic cylinders, rubber bushings and brackets. Since the hydraulic cylinders, rubber bushings and brackets utilized in the front stabilizer 80 are similar to those of the rear stabilizer 25, they are designated by the like reference numerals as their corresponding parts, with prime marks added and will not be described in detail again.

In the front stabilizer arrangement, the port 34'g of the hydraulic cylinder 34' is fluidly connected through a conduit 88 to the port 36'h of the hydraulic cylinder 36' while the port 34'h is to the port 36'g through a conduit 90, so that the upper chamber 34'c of the hydraulic cylinder 34' is fluidly connected to the lower chamber 36'd of the hydraulic cylinder 36' while the lower chamber 34'd is to the upper chamber 36'c. On the other hand, in the rear stabilizer arrangement, the port 34g of the hydraulic cylinder 34 is fluidly connected through a conduit 92 to the port 36h of the hydraulic cylinder 36 while the port 34h is to the port 36g through a conduit 94, so that the upper chamber 34c of the hydraulic cylinder 34 is fluidly connected to the lower chamber 36d of the hydraulic cylinder 36 while the lower chamber 34d is to the upper chamber 36c.

The reference numeral 96 designates a directional control valve which is of the four port, three position, AP and BR port connection type and includes A port fluidly connected through a conduit 98 to the conduit 90, B port fluidly connected through a conduit 100 to the conduit 88, P port fluidly connected through a conduit 102 to the conduit 94 and R port fluidly connected through a conduit 104 to the conduit 92. The conduit 98 is also fluidly connected through a conduit 106 to the conduit 72, while the conduit 100 is fluidly connected through a conduit 108 to the conduit 74. The control valve 96 is operative to assume a valve position 96a when a solenoid 96b is energized and a valve position 96c when a solenoid 96d is energized. When neither of the solenoids 96b and 96d is energized, the directional control valve 96 assumes a center valve position 96e where the A and B ports are respectively connected to the P and R ports. Energization of the solenoids 96b and 96c is controlled by a controller or control circuit 110 by way of an amplifier 112. A sensor 114 is provided for detecting speed of the vehicle and producing signals indicative thereof. The control circuit 110 is supplied with the signals from the vehicle speed sensor 114 and produces electrical signals which are amplified by the amplifier 112 and then applied to the control valve 96 for controlling energization of the solenoids 96b and 96d in the manner as follows. When the vehicle is running at a speed higher than a predetermined value, i.e., upon high speed running of the vehicle, the solenoid 96b is energized, causing the control valve 96 to assume the valve position 96a. When the vehicle is running at a speed lower than a predetermined value, i.e., upon low speed running of the vehicle, the solenoid 96d is energized, causing the control valve 96 to assume the valve position 96c. When the vehicle is running at a speed between the above mentioned predetermined values, i.e., upon medium speed running of the vehicle, neither of the solenoids 96b and 96c is energized, causing the control valve 96 to assume the valve position 96e.

The operation of the above described stabilizer of the present invention will now be described hereinafter.

Upon high speed running of the vehicle, the directional control valve 96 assumes the valve position 96a due to the energization of the solenoid 96b, thus establishing communication between the conduits 102 and 104 while blocking communication between the conduits 98 and 100. When this is the case, the conduits 92 and 94 are fluidly connected with each other, thus allowing all of the chambers 34c, 34d, 36c, and 36d to communicate with each other. By this, the attaching portions 28a and 28b of the front stabilizer bar 26 are freely movable together with the pistons 34b and 36b relative to the vehicle body 14. The rear stabilizer bar 26 therefore becomes ineffective or inoperative and does not increase the actual spring constat of the rear suspension 16, i.e., does not adversely affect the shock-absorbing action of the same. The conduits 98 and 100, which are fluidly separated from each other for the above reason, are not supplied with hydraulic fluid under pressure when the vehicle is running straight with the steering wheel 56 held in the neutral position thereof. This allows the attaching portions 84a and 84b of the front stabilizer bar 80 to be freely movable together with the pistons 34'b and 36'b relative to the vehicle body 14 since hydraulic fluid in the hydraulic cylinders 34' and 36' can be discharged therefrom to flow into the power cylinder 64, etc. The front stabilizer bar 80 therefore becomes ineffective or inoperative and does not increase the actual spring constant of the front suspension 76, i.e., does not adversely affect the shock-absorbing action of the same. From the above, it is to be understood that upon high speed-straight ahead running of the vehicle in which the steering wheel 56 is held in the neutral position thereof, both of the front and rear suspensions 76 and 16 are condition to have a small spring constant, thus making it possible to improve the riding comfort of the vehicle.

Upon high speed cornering of the vehicle in which the steering wheel 56 is turned, either of the chambers 64a and 64b of the power cylinder 64 is supplied with hydraulic fluid from the pump 68 through the conduit 72 or 74. For example, upon leftward cornering of the vehicle in which the steering wheel 56 is turned to the left, hydraulic fluid under pressure is supplied through the conduit 72 to the chamber 64a of the power cylinder 64 and also through the conduits 106 and 98 to the lower chamber 34d of the hydraulic cylinder 34' and the upper chamber 36'c of the hydraulic cylinder 36', thus causing the hydraulic cylinder 34' to contract while the hydraulic cylinder 36' to extend. The attaching portion 84a of the front stabilizer bar 82 is thus cause to move into a higher position or a position closer to the vehicle body 14, while the attaching portion 84b is into a lower position or a position remoter from the vehicle body 14. Due to such up-and-down movement of the attaching portions 84a and 84b the front stabilizer bar 82 is twisted more strongly and therefore can resist more strongly to the roll of the vehicle body 14, i.e., provide the vehicle body with an increased roll rigidity. Under this running condition, the rear stabilizer 25 is held in an ineffective or inoperative condition though the front stabilizer 80 is operative in the above manner. This results in understeer of the vehicle and enables the vehicle to make high speed turns or cornerings safely.

Upon high speed rightward cornering of the vehicle in which the steering wheel 56 is turned to the right, hydraulic fluid under pressure is supplied through the conduit 74 to the chamber 64b of the power cylinder 64 and also through the conduits 108 and 100 to the upper chamber 34'c of the hydraulic cylinder 34' and the lower chamber 36'd of the hydraulic cylinder 36', thus causing the hydraulic cylinder 34' to extend while the hydraulic cylinder 36' to contract, resersely to the case of high speed leftward cornering of the vehicle. Due to this, the front stabilizer bar 82 can provide the vehicle with an increased roll rigidity similarly to the case of leftward cornering. Under this running condition, the stabilizer of the present invention thus can improve the roll stability of the vehicle and at the same time enables the vehicle to make high speed turns or cornerings safely due to the resulting understeer of the vehicle.

Upon medium speed running of the vehicle, the directional control valve 96 assumes the valve position 96c, due to the energization of the solenoid 96d, thus obstruction communication between the conduits 98 and 100 and also between the conduits 102 and 104. When this is the case, neither supply nor discharge of hydraulic fluid to and from the hydraulic cylinders 34 and 36 occurs. Due to this, the attaching portions 28a and 28b of the stabilizer bar 26 are prevented from movement relative to the vehicle body 14 and held fixed or stationary relative to same. Twist of the rear stabilizer bar 26 is thus caused by the roll of the vehicle body 14 in a manner to be directly proportional to same. Under this running condition, the rear stabilizer bar 26 therefore operates in the same way as the conventional stabilizer bar and increases the roll rigidity of the vehicle to a certain extent. On the other hand, the front stabilizer bar 82 can effect a stabilizing action similar to that effected thereby in the case of the aforementioned high speed running of the vehicle, thus improving the riding comfort upon straight ahead running while strongly resisting roll of the vehicle body upon cornering for thereby improving the roll stability of the vehicle. Further, since upon cornering the front stabilizer bar 82 becomes effective or operative more strongly than the rear stabilizer bar 26, i.e., the front stabilizer bar 82 resists the roll of the vehicle body 14 more strongly than the rear stabilizer bar 26, understeer of the vehicle results though not so strong as in the case of the aforementioned high speed cornering, thus emabling the vehicle to make medium speed turning or cornering safely.

Upon low speed running of the vehicle, the directional control valve 96 assumes the valve position 96e since neither of the solenoids 96b and 96d is energized, thus establishing communication between the conduits 98 and 102 and also between the conduits 100 and 104. When the vehicle is running straight with the steering wheel 56 held in the neutral position thereof, there is no supply of hydraulic fluid under pressure to the conduits 72 and 74 and therefore the conduits 98 and 100, thus allowing all of the attaching portions 28a, 28b 84a and 84b of the stabilizer bars 26 and 80 to be freely movable upwardly and downwardly relative to the vehicle body 14. Accordingly, either of the stabilizer bars 26 and 80 becomes ineffective on inoperative and does not increase the spring constant of either of the front and rear suspensions 76 and 16, thus improving the riding comfort of the vehicle upon straight ahead running.

Upon low speed cornering of the vehicle in which the steering wheel 56 is turned, either of the chambers 64a and 64b of the power cylinder 64 is supplied with hydraulic fluid from the pump 68 throgh the conduit 72 or 74. For example, upon leftward cornering, hydraulic fluid under pressure is supplied through the conduits 72, 106, 98 and 102 to the lower chambers 34h and 34'h of the hydraulic cylinders 34 and 34' and the upper chambers 36g and 36'g of the hydraulic cylinders 36 and 36', thus causing the hydraulic cylinders 34 and 34' to contract while the hydraulic cylinders 36 and 36' to extend. Due to this, the front and rear stabilizer bars 80 and 26 are twisted more strongly than in the case where the attaching portions of the stabilizers are held in a stationary or fixed level relative to the vehicle body. The front and rear stabilizer bars 82 and 26 thus can resist strongly the roll of the vehicle body 14 and can increase the roll rigidity of the vehicle. Since upon this low speed cornering both of the front and rear stabilizer bars 80 and 26 become strongly effective, understeer of the vehicle is reduced to minimum and enabling the vehicle to make low speed turning or cornering quickly.

Figure 4:
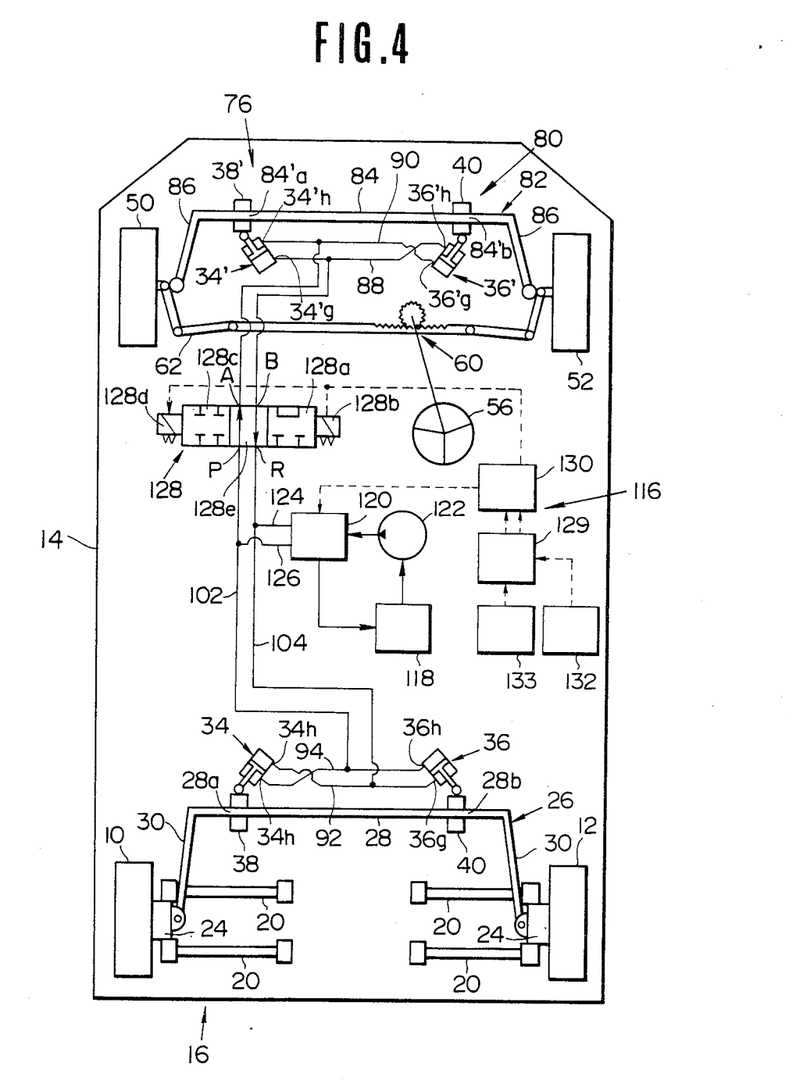
FIGS. 4 and 5 are views similar to FIG. 1 but showing modifications of the present invention.
Figure 5:
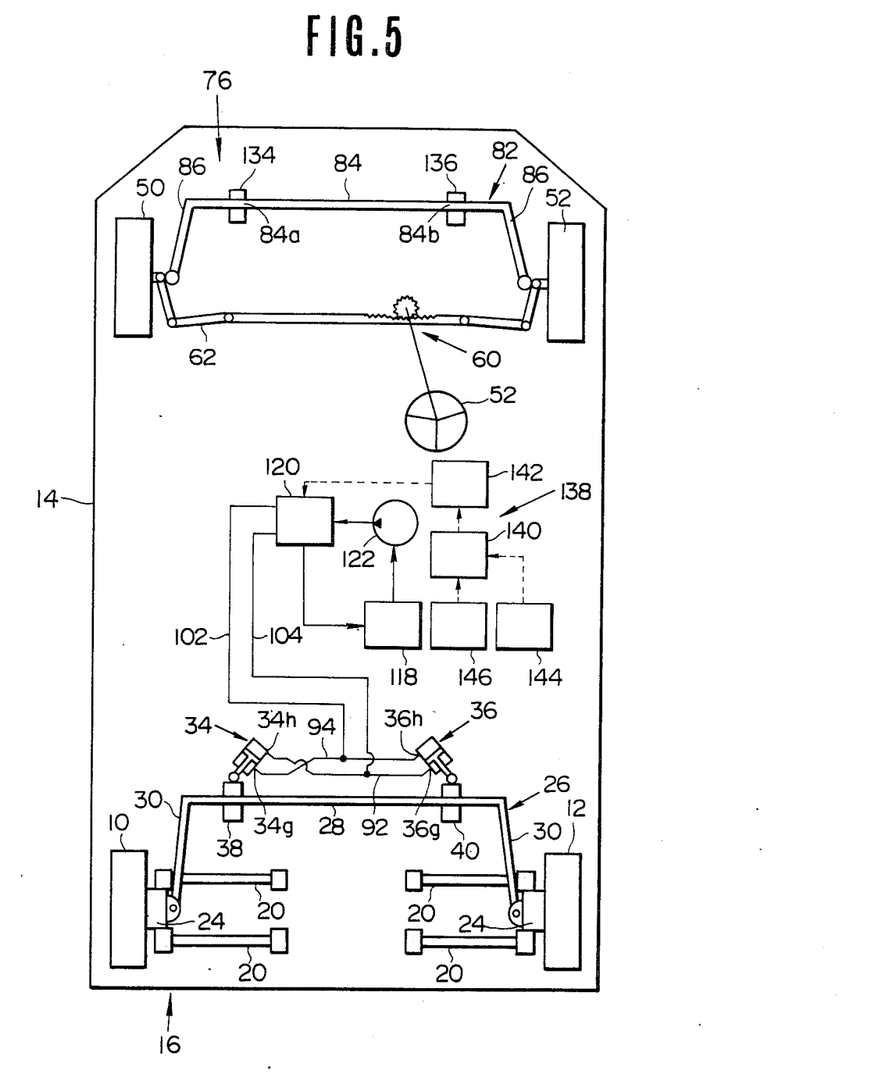

Referring to FIG. 4, in which like or corresponding parts to those of the previous embodiment are disignated by the same reference characters, a modified embodiment of the present invention will be described. This embodiment differs from the previous embodiment in that a power steering system is not used for controlling the operation of the front and rear stabilizers 80 and 26 but a hydraulic stabilizer control system 116 is provided which is exclusively used for controlling the operation of the stabilizers. The stabilizer control system includes a reservoir 118, an electro hydraulic converter 120 and a pump 122 having an inlet fluidly connected to the converter 118 and an outlet fluidly connected to a fluid inlet port of the electro hydraulic converter 120. The converter 120 also has two fluid outlet ports fluidly connected through conduits 124 and 126 to the conduits 98 and 100, respectively.

A directional control valve 128 is provided which has a different port arrangement as compared with that used in the previous embodiment though of the same four port, three-position, AP and BR port connection type. The directional control valve 128 is arranged to have A, B, P and R ports fluidly connected to the conduits 98, 100, 102 and 104, respectively and is controlled together with the electro hydraulic converter 120 by a control circuit 129 by way of an amplifier 130. The control circuit 129 is electrically connected to a vehicle speed sensor 132 and a vehicle behavior sensor 133. The vehicle speed sensor 132 detects speed of the vehicle and produces signals indicative thereof. The vehicle behavior sensor 133 detects a vehicle yaw rate, lateral acceleration and roll represented by an angle of turning of the steering wheel 56 out of the neutral position and produces signals indicative thereof. The control circuit 129 is supplied with the signals from the vehicle speed sensor 132 and the vehicle behavior sensor 133 and produces electrical signals which are amplified by the amplifier 130 and then applied to the directional control valve 128 and the electro hydraulic converter 120 for controlling the operations of same in the following manner. Upon low speed running and small roll of the vehicle (i.e., when the vehicle is running at a speed lower than a predetermined value and its roll is small), the directional control valve 128 assumes a valve position 128a due to energization of a solenoid 128b. Upon low speed running and large roll of the vehicle, the directional control valve 128 assumes a valve position 128c due to energization of a solenoid 128d. Upon high speed running of the vehicle (i.e., when vehicle is running at a speed larger than the above mentioned predetermined value), the directional control valve 128 assumes a valve position 128e since neither of the solenoids 128b and 128d is energized under this vehicle running condition. The electro hydraulic converter 120 is actuated in accordance with roll and the direction of same. Upon roll of the vehicle body 14 to the left due to turning of the steering wheel 56 to the right, the electro hydraulic converter 120 supplies the conduit 104 with hydraulic fluid the pressure of which is proportional to the amount of roll. Conversely, upon roll of the vehicle body 14 to the right due to turning of the steering wheel 56 to the left, the electro hydraulic converter 120 supplies the conduit 102 with hydraulic fluid the pressure of which is proportional to the amount of the roll. Upon straight ahead running of the vehicle with the steering wheel 56 held at the neutral position thereof, the electro hydraulic converter 120 does not supply hydraulic fluid uner pressure to either of the conduits 102 and 104.

With the above arrangement, upon low speed and small roll of the vehicle (including straight ahead running), the directional control valve 128 assumes the valve position 128a due to the energization of the solenoid 128b, thus obstructing communication between the conduits 102 and 104 while establishing communication between the conduits 98 and 100. Due to this, whether the vehicle is running straight or cornering, the front stabilizer bar 82 becomes ineffective or inoperative and does not resist roll of the vehicle 14 since all of the chambers of the hydraulic cylinders 34' and 36' are communicated with each other to allow the attaching portions 84a and 84b to be freely movable upwardly and downwardly relative to the vehicle body 14. On the other hand, the rear stabilizer bar 26 becomes effective or operative upon cornering of the vehicle and ineffective upon straight ahead running of same. Upon cornering of the vehicle, the electro hydraulic converter 120 supplies either of the conduits 102 and 104 with hydraulic fluid under pressure to additionally twist the rear stabilizer bar 26 for thereby making the same effective more strongly, thus increasing the roll rigidity of the vehicle. Upon straight ahead running of the vehicle, the rear stabilizer bar 26 becomes ineffective since the electro hydraulic converter 120 does not supply any hydraulic fluid under pressure to the conduits 102 and 104 but can permit fluid in the hydraulic cylinders 34 and 36 to be discharged therefrom to flow into the reservoir 118, thus improving the riding comfort of the vehicle. Since upon low speed cornering the front stabilizer bar 82 becomes ineffective or inoperative while the rear stabilizer bar 26 becomes strongly effective or operative, oversteer of the vehicle results, thus enabling the vehicle to make low speed turning or cornering quickly.

Upon low speed and large roll of the vehicle, the directional control valve 128 assumes the valve position 128c due to the energization of the solenoid 128d, thus obstructing communication between the conduits 98 and 100 and also between the conduits 102 and 104. Due to this, the front stabilizer bar 82 becomes effective or operative in the same way as the conventional stabilizer bar since the attaching portions 84a and 84b thereof are held at a fixed or stationary level relative to the vehicle body 14. On the other hand, the rear stabilizer bar 26 becomes strongly effective or operative since upon roll of the vehicle the electro hydraulic converter 120 supplies predetermined one of the conduits 102 and 104 with hydraulic fluid under pressure so as to additional twist the rear stabilizer bar 26. Oversteer of the vehicle thus results and it becomes possible for the vehicle to make low speed turning or cornering quickly.

Upon high speed running of the vehicle, the directional control valve 128 assumes the valve position 128e since neither of the solenoids 128b and 128d are energized, thus communicating the conduits 98 and 100 with the conduits 102 and 104, respectively. Upon high speed straight ahead running with the steering wheel 56 held in the neutral position thereof, the electro hydraulic converter 120 does not supply any hydraulic fluid under pressure to the conduits 102 and 104 but may allows fluid in the hydraulic cylinders 34, 36, 34' and 36' to be discharged therefrom to flow into the reservoir 118, thus making both of the front and rear stabilizers 80 and 26 ineffective or inoperative to improve the riding comfort of the vehicle under this running condition. When the steering wheel 56 is turned, i.e., upon roll of the vehicle, the electro hydraulic converter 120 supplies predetermined one of the conduits 102 and 104 with hydraulic fluid under pressure in accordance with the direction of turning or roll, thus enabling both of the front and rear stabilizer bars 80 and 26 to strongly resist the roll of the vehicle body 14. Understeer of the vehicle thus results and it becomes possible for the vehicle to make high speed turning or cornering safely.

Referring to FIG. 6, in which like or corresponding parts to those of the previous embodiment of FIG. 4 are designated by the same reference characters, a further modification of the present invention will be described. This embodiment differs from the previous embodiment of FIG. 4 in that the front stabilizer bar 82 is mounted on the vehicle body in the conventional manner, i.e., mounted by way of rubber bushings 134 and 136 in such a manner that the attaching portions 84a and 84b of the front stabilizer bar 82 are not movable toward and away relative to the vehicle body 14. Only the rear stabilizer bar 26 is mounted to be movable toward and away from the vehicle body 14 in accordance with the present invention.

A hydraulic stabilizer control system 138 includes, similarly to the previous embodiment of FIG. 4, a reservoir 118, an electro hydraulic converter 120 and a pump 122. The electro hydraulic converter 120 is controlled by a controller or control circuit 140 by way of an amplifier 142. The control circuit 140 controls the operation of the electro hydraulic converter 120 in accordance with lateral acceleration of the vehicle detected by a lateral acceleration sensor 144 in the following manner. Upon rightward lateral acceleration of the vehicle (leftward turning), the electro hydraulic converter 120 supplies the conduit 102 with hydraulic fluid the pressure of which is proportional to the degree of the lateral acceleration while draining the conduit 104 into the reservoir 118. Upon leftward lateral acceleration of the vehicle (righward turning), the electro hydraulic converter 120 supplies the conduit 104 with hydraulic fluid the pressure of which is proportional to the degree of the lateral acceleration while draining the conduit 102 into the reservoir 118. Upon straight ahead running of the vehicle, the electro hydraulic converter 120 does not supply any hydraulic fluid under pressure to either of the conduits 102 and 104 but may allows fluid in the hydraulic cylinders 34 and 36 to be discharged therefrom to flow into the resevoir 118.

With the above arrangement, the rear stabilizer bar 26 becomes ineffective upon straight ahead running of the vehicle but strongly effective or operative upon turning or cornering of the vehicle, thus increasing the roll rigidity of the vehicle and at the same time improving the riding comfort.

In addition to the above arrangement, a manual switch 146 may be employed which is operative to supply the control circuit 140 with a signal representing a driver's taste in riding comfort, i.e. whether the driver likes a soft riding feel or hard riding feel. On the basis of the signal from the manual switch 146, the pressure of hydraulic fluid supplied from the electro hydraulic converter 120 to the conduits 102 and 104 may be varied or modified so as to meet the driver's taste.

Further, as the load on the vehicle increases, the centrifugal force acting on the rear part of the vehicle upon turning increases. This results in oversteer of the vehicle. In order to correct this tendency, a load sensor may be provided in place of the manual switch 146 for reducing, in accordance with signal from the load sensor, the pressure of hydraulic fluid from the electro hydraulic converter 120 as the load on the vehicle increases.

What is claimed is:

1. A stabilizer for an automotive vehicle having a body and a pair of laterally opposed road wheels independently suspended on the vehicle body for upward and downward movement relative to each other and the vehicle body, said stabilizer comprising:
    a stabilizer bar twistable about a rotational axis extending transversely of the vehicle to resist the relative upward and downward movement of the road wheels and having two attaching portions opposed along said axis at which it is to be attached to the vehicle body; and
    means for rotatably attaching said attaching portions to the vehicle body in such a manner that at least one of the attaching portions is movable upwardly and downwardly relative to the vehicle body to change the effectiveness of the stabilizer bar in accordance with variations of running condition of the vehicle.

2. A stabilizer as set forth in claim 1, in which said two attaching portions are movable in opposite directions to cause said stabilizer bar to be twisted in addition to twist caused by the relative upward and downward movement of the road wheels under certain running condition of the vehicle and freely movable to make said stabilizer bar ineffective under another running condition of the vehicle.

3. A stabilizer as set forth in claim 1, in which the vehicle further has suspension members rotatably supporting the road wheels, respectively and movable upwardly and downwardly in response to the upward and downward movement of the road wheels, said stablilizer bar being U-shaped to have a main body and lever arms at each end thereof extending longitudinally of the vehicle body to terminate in end portions pivotally connected to the suspension members, said attaching portions being portions of said main body.

4. A stabilizer as set forth in claim 3, in which said attaching means comprises a pair of extensible hydraulic cylinders disposed vertically between the vehicle body and said attaching portions of said stabilizer bar, and a hydraulic stabilizer control system for controlling supply of hydraulic fluid to said hyraulic cylinders and drainage of same in accordance with running conditions of the vehicle.

5. A stabilizer as set forth in claim 4, in which each of said hydraulic cylinders comprises a cylinder body attached at the upper end thereof to the vehicle body, a piston slidably mounted in said cylinder body to define upper and lower cylinder chambers and a piston rod extending through said lower cylinder chamber to have an upper end attached to said piston and a lower end projecting downwardly from the lower end of said cylinder body to rotatably carry thereon each of said attaching portions of said stabilizer bar.

6. A stabilizer as set forth in claim 5, in which said road wheels are rear road wheels and said stabilizer bar is a front stabilizer bar for use with said rear road wheels, said vehicle further having a pair of laterally opposed front road wheels independently suspended on the vehicle body for upward and downward movement relative to each other and the vehicle body, said stabilizer further comprising a front stabilizer bar twistable to resist the relative upward and downward movement of the front road wheels and having two axially opposed attaching portions at which it is rotatably attached to the vehicle body by said attaching means in such a manner that at least one of said attaching portions of said front stabilizer bar is movable relative to the vehicle body to change the effectiveness of the front stabilizer bar in accordance with variation in running condition of the vehicle.

7. A stabilizer as set forth in claim 6, in which said two attaching portions of said front stabilizer bar are movable in the opposite directions to cause said stabilizer bar to be twisted in addition to twist caused by the relative upward and downward movement of the road wheels under a certain running condition of the vehicle, freely movable to make said front stabilizer ineffective under another running condition of the vehicle, and held at a fixed level relative to the vehicle body under a further running condition of the vehicle.

8. A stabilizer as set forth in claim 7, in which the vehicle further has front suspension members rotatably supporting the front road wheels, respectively and movable upwardly and downwardly in response to the upward and downward movement of the front road wheels, said front stabilizer bar being U-shaped to have a main body and lever arms at each end thereof extending longitudinally of the vehicle body to terminate in end portions pivotally connected to the front suspension members, said attaching portions being portions of said main body, said attaching means further comprising a pair of extensible front stabilizer hydraulic cylinders disposed vertically between the vehicle body and said attaching portions of said front stabilizer bar, each of said front stabilizer hydraulic cylinders comprising a front stabilizer cylinder body attached at the upper end thereof to the vehicle body, a front stabilizer piston slidably mounted in said front stabilizer cylinder body to define upper and lower cylinder chambers and a front stabilizer piston rod extending through said lower chamber of said front stabilizer cylinder body to have an upper end attached to said front stabilizer piston and a lower end projecting downwardly from the lower end of said front stabilizer cylinder body to rotatably carry thereon each of said attaching portions of said front stabilizer bar, said hydraulic stabilizer control system being operative to control supply of hydraulic fluid to said front stabilizer hydraulic cylinders and drainage of same in accordance with running conditions of the vehicle.

9. A stabilizer as set forth in claim 8, in which the vehicle further has a power steering including a hydraulic servo formed with a pair of servo chambers which are fuildly separated by a servo piston and one of which is pressurized and the other is drained when to assist turning of the front road wheels, and in which said hydraulic stabilizer control system comprises first and second conduits fluidly connecting said upper and lower chambers of one of said rear stabilizer hydraulic cylinders to said lower and upper chambers of the other of said rear stabilizer hydraulic cylinders, respectively, third and fourth conduits fluidly connecting said upper and lower chambers of one of said front stabilizer hydraulic cylinders to lower and upper chambers of the other of said front stabilizer hydraulic cylinders, respectively, a directional control valve having first, second, third and fourth ports, a fifth conduit fluidly connecting said first port to said first conduit, a sixth conduit fluidly connecting said second port to said second conduit, a seventh conduit fluidly connecting said third port to said third conduit, an eighth conduit fluidly connecting said fourth port to said fourth conduit, said seventh and eighth conduits being fluidly connected to said servo chambers of said power steering hydraulic servo, said directional control valve being operative to assume a first valve position in which said fifth and sixth conduits are fluidly connected to said seventh and eighth conduits, respectively, a second valve position in which said fifth and sixth conduits are fluidly connected to each other while the seventh and eighth conduits are fluidly separated from each other and a third valve position in which said fifth, sixth, seventh and eighth conduits are fluidly separated from each other, a sensor for sensing running speed of the vehicle and producing a signal representative thereof, and a control circuit for controlling a valve position of said directional control valve on the basis of the signal from said sensor.

10. A stabilizer as set forth in claim 8, in which said hydraulic stabilizer control system comprises first and second conduits fluidly connecting said upper and lower chambers of one of said rear stabilizer hydraulic cylinders to said lower and upper chambers of the other of said rear stabilizer hydraulic cylinders, respectively, third and fourth conduits fluidly connecting said upper and lower chambers of one of said front stabilizer hydraulic cylinders to lower and upper chambers of the other of said front stabilizer hydraulic cylinders, respectively, a directional control valve having first, second third and fourth ports, a fifth conduit fluidly connecting said first port to said first conduit, a sixth conduit fluidly connecting said second port to said second conduit, a seventh conduit fluidly connecting said third port to said third conduit, an eighth port fluidly connecting said fourth port to said fourth conduit, said directional control valve being operative to assume a first valve position in which said fifth and sixth conduits are fluidly connected to said seventh and eighth conduits, respectively, a second valve position in which said fifth and sixth conduits are fluidly separated from each other while said seventh and eight conduits are fluidly connected to each other and a third valve position in which said fifth, sixth, seventh and eighth conduits are fluidly separated from each other, a reservoir, a pump fluidly connected to said reservoir, an electro hydraulic converter fluidly connected to said reservoir, pump and fifth and sixth conduits for selectively supplying hydraulic fluid from said pump, the pressure of which is variable with variation of running condition of the vehicle, to one of said fifth and sixth conduits while draining the other of said conduits into said reservoir, a first sensor for sensing running speed of the vehicle, a second sensor for sensing a yaw rate, lateral acceleration and roll of the vehicle and producing a signal indicative thereof, and a control circuit for controlling a valve position of said directional control valve on the basis of the signals from said first and second sensors.

11. A stabilizer as set forth in claim 5, in which said hydraulic stabilizer control system comprises first and second conduits fluidly connecting said upper and lower cylinder chambers of one of said hydraulic cylinders to said lower and upper cylinder chambers of the other of said hydraulic cylinders, respectively, a reservoir, a pump fluidly connected to said reservoir, an electro hydraulic converter fluidly connected to said reservoir, pump and first and second conduits for selectively supplying hydraulic fluid from said pump, the pressure of which is variable with variation of running condition of the vehicle, to one of said first and second conduits while draining the other of said conduits into said reservoir, a sensor for sensing a running condition of the vehicle and produces a signal representative thereof and a control circuit for controlling the operation of said electro hydraulic converter depending upon the signal from said sensor.

12. A stabilizer as set forth in claim 11, in which said sensor is of the kind for sensing a lateral acceleration of the vehicle.

13. A stabilizer as set forth in claim 12, in which said hydraulic stabilizer control system further comprises a manual switch for supplying said control circuit with a signal representative of a driver's taste in riding comfort for modifying the pressure of hydraulic fluid to be supplied from said electro hydraulic converter to said first and second conduits.

14. A stabilizer as set forth in claim 13, in which said road wheels are rear road wheels and said stabilizer bar is a front stabilizer bar for use with said rear road wheels, said vehicle further having a pair of laterally opposed front road wheels independently suspended on the vehicle body for upward and downward movement relative to each other and the vehicle body and a front stabilizer bar twistable to resist the relative upward and downward movement of the rear road wheels and having two axially opposed attaching portions at which it is rotatably attached to the vehicle body in such a manner that said attaching portions are held at a fixed level relative to the vehicle body.

* * * * *